(12) United States Patent
Aguilar et al.

(10) Patent No.: US 6,643,772 B1
(45) Date of Patent: Nov. 4, 2003

(54) UNIVERSAL BOOT CODE FOR A COMPUTER NETWORK

(75) Inventors: Maximino Aguilar, Austin, TX (US); Norbert M. Blam, Austin, TX (US); James Michael Stafford, Round Rock, TX (US); Charles Edward Tysor, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 573 days.

(21) Appl. No.: 09/615,767

(22) Filed: Jul. 13, 2000

(51) Int. Cl.$^7$ .................................. G06F 9/24
(52) U.S. Cl. ............................. 713/2
(58) Field of Search ................. 713/2, 1, 100

(56) References Cited

U.S. PATENT DOCUMENTS

| | | | | |
|---|---|---|---|---|
| 5,842,011 A | * | 11/1998 | Basu .............................. | 713/2 |
| 5,860,001 A | * | 1/1999 | Cromer et al. ................. | 713/1 |
| 5,974,547 A | * | 10/1999 | Klimenko ...................... | 713/2 |
| 6,085,318 A | * | 7/2000 | Vander Kamp et al. ........ | 713/1 |
| 6,170,008 B1 | * | 1/2001 | Bahlmann et al. .......... | 709/220 |
| 6,421,777 B1 | * | 7/2002 | Pierre-Louis et al. .......... | 713/2 |

* cited by examiner

*Primary Examiner*—Dennis M. Butler
(74) *Attorney, Agent, or Firm*—Joseph P. Lally; John D. Flynn; Mark E. McBurney

(57) ABSTRACT

A method of and software for booting a network computer with universal boot code is disclosed. Initially, the type of a boot device is determined from among a set of possible boot devices. A command in a high level boot code segment of the boot code software is then translated to a command executable by the boot device based upon the determined device type. The converted command is then executed on the boot device to transfer data between the network computer and the boot device. The boot code is preferably compatible with a variety of boot devices including a hard disk boot device, an NFS server boot device, as well as a TFTP server boot device. In an embodiment in which the boot device is a TFTP boot device, a READ command from the high level boot code is translated to a TFTP read request. The data transferred by the TFTP read request may be stored in a file cache on the network computer. During a subsequent high level boot code READ command, the software interface may determine if the requested data is cached in the file cache, and if so, it may retrieve the data from the file cache. If the high level boot command is a SEEK command, and the boot device is a TFTP device, the converted command may include a TFTP read request. The software interface may determine the relative location of a file location indicated by the SEEK command and a current location of a file pointer and abort the current TFTP transfer if the file location indicated by the SEEK precedes the current location of the file pointer. The interface may then resend a TFTP read request to advance the file pointer to the file location indicated by the SEEK command. In this manner, the software interface and device specific segments can emulate a file type device when the boot device is a TFTP device.

21 Claims, 5 Drawing Sheets

UNIVERSAL BOOT CODE FOR A COMPUTER NETWORK

BACKGROUND

1. Field of the Present Invention

The present invention generally relates to the field of computer networks and more particularly to a network computer boot method and software that is transparent to the specific type of boot device such that the same code is used whether booting from a Network File System (NFS) server, a hard disk, or a (Trivial File Transfer Protocol) TFTP server.

2. History of Related Art

The importance of maximizing value by carefully controlling the implementation of resources on each computer within a computer has network has increased with the increasing number of applications for which a local area network provides a desirable solution. Many existing local area networks consist largely of two or more interconnected desktop computers, possibly in combination with a large capacity, centralized server machine. The wide spread availability and acceptance of disk based operating system software that eliminated much of the design overhead associated with implementing local area networks has greatly contributed to the proliferation of networks comprised of a two or more essentially stand alone machines.

Despite the ease with which they can be implemented, these networks are not designed to maximize value to the end user because they fail to distribute resources in an optimal fashion. More specifically, networks comprised of a collection of stand alone machines unnecessarily duplicate resources that can be offered via the network and centralized in one or more network servers. Attempts to address this concern include centralizing mass storage in a network server, RAID system, or other suitable storage facility.

Unfortunately, the removal of hard disks from network computers in an effort to reduce network costs introduces other problems. One such problem is the manner in which each of the diskless network computers is booted. In a desktop-type machine, the entire operating system resides in the machine's local permanent storage, where it is easily transferred into system memory as needed. In a diskless network computer, it is typically necessary to retrieve all or part of the operating system from a remote, permanent storage device. Typically, a diskless network computer includes a small amount of local permanent storage (such as a ROM or other suitable non-volatile memory device) that has sufficient capacity to include high level boot code that is responsible for transferring the operating system from a remote location and restoring the network computer to a known state.

Computer networks are frequently characterized by a variety of different computing devices. In such an environment, network computers make take on many variations. While some of the network computes are truly diskless, others may include a flash card or other comparable device that provides sufficient permanent storage to contain all code necessary to fully boot the computer. Still other devices on the network may include their own hard disks. Of the computers on a network that lack any significant local permanent storage, some may be configured to boot over the network via a protocol such as NFS, in which the boot server appears as a file device, other machines may be designed to boot via a simpler protocol such as the Trivial File Transfer Protocol (TFTP).

The TFTP is an internet protocol that allows users to transfer files to and from a remote machine, which may be specified on the command line. More detailed information regarding TFTP is available in K. Sollins, *The TFTP Protocol* (*Revision* 2), Internet RFC #1350 (1992), which is available from the RFC Editor at www.rfc-editor.com and is incorporated by reference herein. Unlike most devices that are used as boot devices, a TFTP compliant server supports only a limited set of commands. More specifically, TFTP supports read and write functions, but only for reading and writing consecutive blocks of data always starting from the beginning of the file. Code that is written for a boot device that appears as a file device (i.e., a device that supports open, close, read, write, and seek functions) is not functional on a TFTP network.

Network flexibility and reliability increases if each network computer is enabled to boot from a variety of boot devices. If a particular boot device is unavailable, a network computer can boot from an alternative device. Thus, it is desirable for a network computer to be able to boot from multiple boot devices. It is further desirable if complexity in the boot code is minimized. Accordingly, it is desirable to implement boot code for use in a computer network having multiple boot devices, where the boot device type is transparent to the boot code.

SUMMARY OF THE INVENTION

The problem identified is addressed by a method and software for booting a network computer with universal boot code that supports a variety of boot devices regardless of the specific functions supported by each boot device. Initially, the type of a boot device is determined from among a set of possible boot devices. A command in a high level boot code segment of the boot code software is then translated by a software interface of the boot code to a command executable by the boot device based upon the determined device type. The converted command is then executed on the boot device to transfer data between the network computer and the boot device. The boot code is preferably compatible with a variety of boot devices including a hard disk boot device, an NFS server boot device, as well as a TFTP server boot device. In an embodiment in which the boot device is a TFTP boot device, a READ command from the high level boot code is translated to a TFTP read request. The data transferred by the TFTP read request may be stored in a file cache on the network computer. During a subsequent high level boot code READ command, the software interface may determine if the requested data is cached in the file cache and, if so, it may retrieve the data from the file cache. If the high level boot command is a SEEK command, and the boot device is a TFTP device, the converted command may include a TFTP read request. The software interface may determine the relative location of a file location indicated by the SEEK command and a current location of a file pointer and abort the current TFTP transfer if the file location indicated by the SEEK precedes the current location of the file pointer. The interface may then resend a TFTP read request to advance the file pointer to the file location indicated by the SEEK command. In this manner, the software interface and device specific segments can emulate a file type device when the boot device is a TFTP device.

BRIEF DESCRIPTION OF THE DRAWINGS

Other objects and advantages of the invention will become apparent upon reading the following detailed description and upon reference to the accompanying drawings in which.

Figure 1:
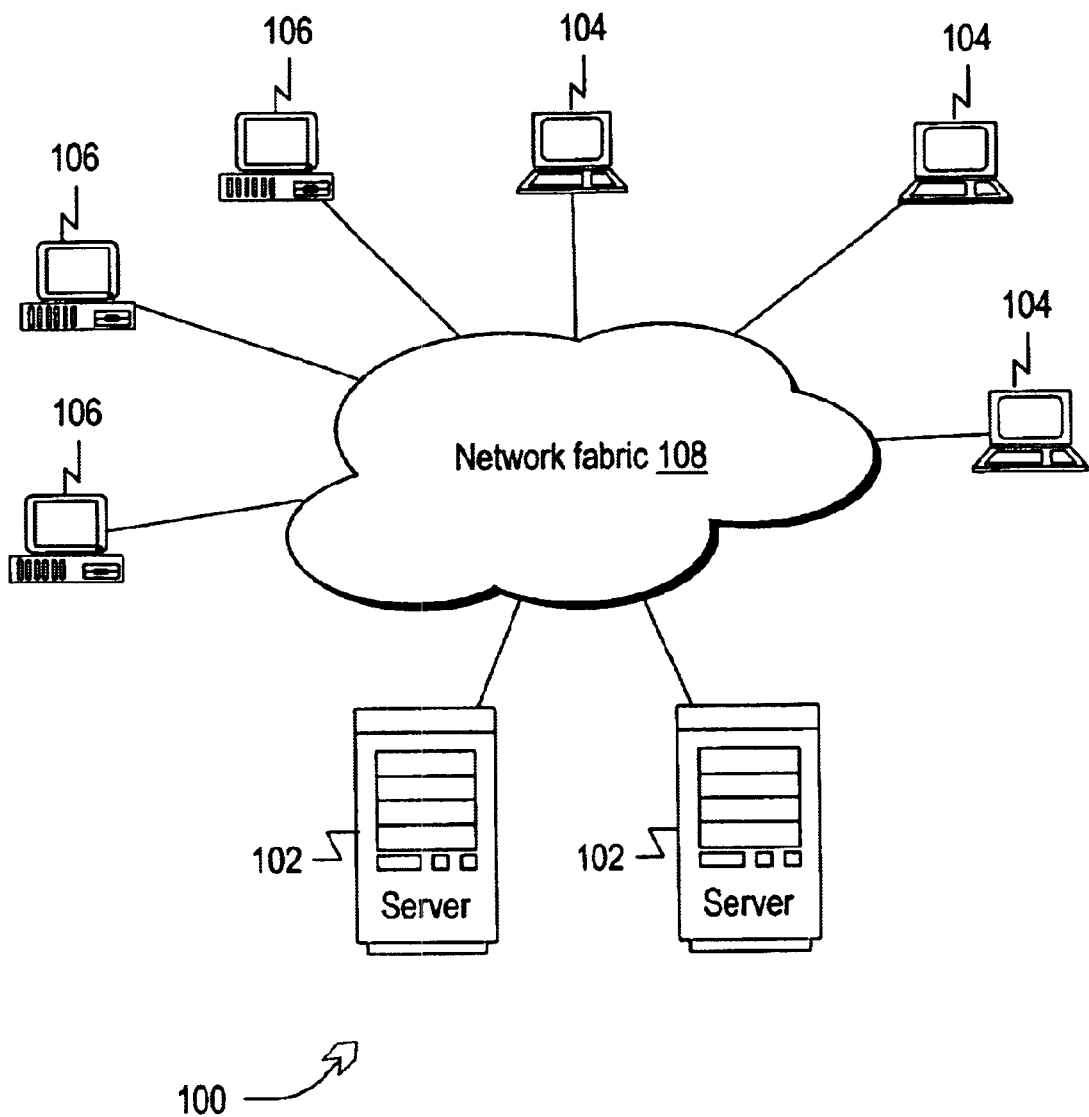
FIG. 1 is an illustration of an embodiment of a computer network.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Turning now to the drawings, FIG. 1 depicts a simple embodiment of a computer network 100 suitable for use with the present invention. Network 100 may include multiple data processing systems including one or more servers 102, one or more desktop or workstation machines 106, and one or more network computers 104, all of which are interconnected via a network fabric 108, such as a local area network (LAN) or wide area network. Typically, each server 102 is characterized by relatively large, permanent storage facilities such as redundant arrays of inexpensive disks (RAID) systems that are prevalent in a variety of commercially distributed server machines. Similarly, desktop machines 106 typically include local permanent storage in the form of a hard disk. Network computers 104, on the other hand, may comprises "diskless" machines that lack any significant local permanent storage. In other embodiments, network computers 104 may lack a conventional hard disk but may include local permanent storage in the form of a flash memory device (flash card) that is an electrically programmable non-volatile memory element.

It will be appreciated that each network computer 104, (as well as desktop computers 106 and servers 102) will have to be booted occasionally in response to a boot event such as a power-on event. Booting, as used herein, refers generally to the process by which a data processing system is transitioned from an essentially undetermined state (such as a power off state) to a known state. Booting typically includes invoking a relatively small segment of code (referred to herein as the "boot code") in response to a boot event. The boot code typically resides on a non-volatile storage device (such as a ROM) of the network computer. The boot code typically performs functions such as restoring the network computer to a predetermined state by, for example, setting registers values and retrieving code or data from a remote storage device. In one embodiment, the boot code retrieves operating system code from the remote storage device and stores the retrieved code in system memory (i.e., DRAM).

Figure 2:
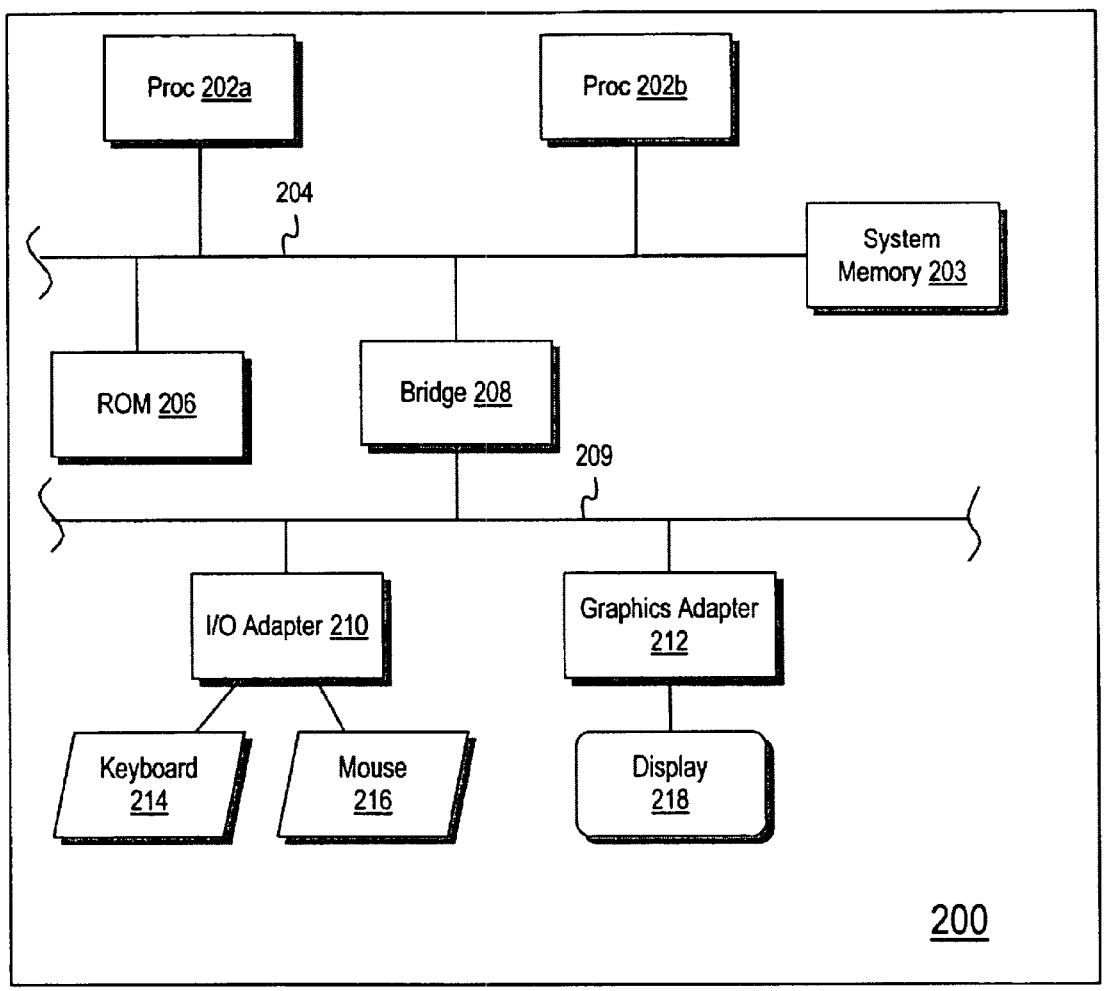
FIG. 2 is a simplified block diagram of an embodiment of a data processing system suitable for use with present invention.

Prior to discussing details of the boot code as contemplated by the present invention, selected hardware features of network computer 104 are described. Turning to FIG. 2, a simplified block diagram of an embodiment of a data processing system 200 suitable for use as a network computer 104 in computer network 100 is presented. In the depicted embodiment, data processing system 200 includes one or more processors 202a through 202n (generically or collectively referred to herein as processor(s) 202) connected to a system bus 204. A system memory (DRAM) 203 and a non-volatile memory (ROM) 206 are accessible to processors 202 via system bus 204. In one embodiment, ROM 206 contains boot code as described in greater detail below.

Each processor 202 may be implemented as a reduced instruction set (RISC) microprocessor such as PowerPC® microprocessor from IBM Corporation. In another embodiment, processors 202 may comprise x86 compatible microprocessors such as Pentium® processors from Intel Corporation and Athlon® processors from Advanced Micro Devices. Typically, an operating system software is installed on each data processing system 200 of network 100 after the boot sequence is completed. Suitable operating system software may include a Unix based operating system such as the AIX® operating system from IBM, a non-Unix based operating system such as the Windows® family of operating systems from Microsoft, or a network operating system such as JavaOS® from Sun Microsystems.

In the depicted embodiment, data processing system 200 further includes a bus bridge 208 that couples system bus 204 to an I/O bus 209. Although only a single bus bridge 208 and a single I/O bus 209 are depicted, other embodiments of data processing system 200 may include multiple bridges 208 and multiple I/O busses 209. I/O bus 209 may be implemented according to any of a variety of industry standardized I/O bus architectures including the industry standard architecture (ISA), the extended industry standard architecture (EISA), the peripheral components interface (PCI), and the advanced graphics peripheral (AGP) architecture, all as will be familiar to those in the field of microprocessor based computing systems. In the depicted embodiment of system 200, an I/O adapter 210 connects a keyboard 214 and a mouse 216 to I/O bus 209 while a graphics adapter 212 connects a display device (monitor) 218 to I/O bus 209. In other embodiments, the display device 218, keyboard 214, and mouse 216 may be connected to different I/O busses.

Figure 3:
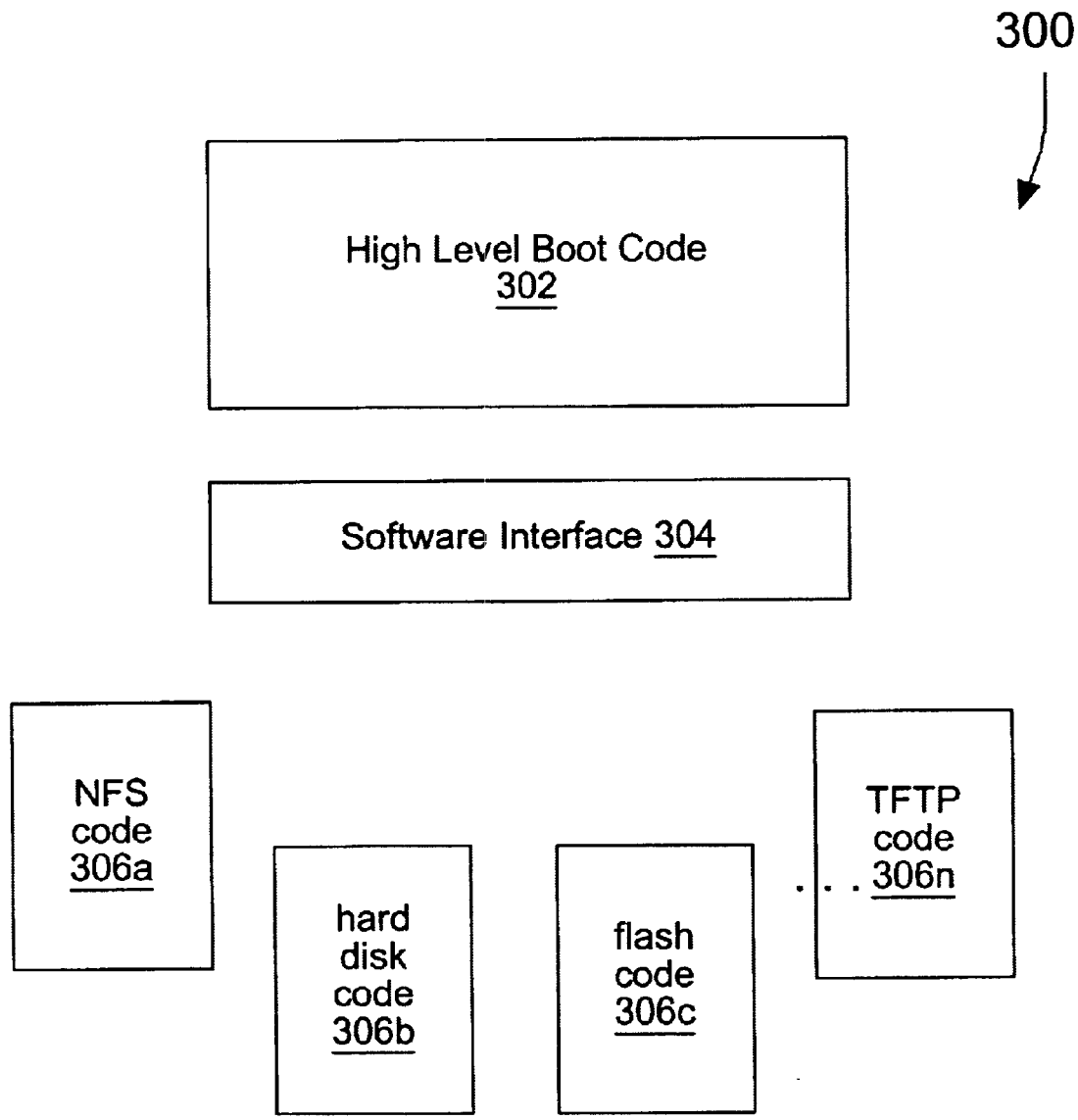
FIG. 3 is a conceptualized representation of computer network boot code software according to one embodiment of the invention.

Turning now to FIG. 3, a conceptualized representation of boot code 300 suitable for booting a data processing system such as network computers 104 of network 100 according to one embodiment of the invention is depicted. The invention may be implemented as a set of processor executable instructions (i.e., software) stored on a computer readable medium. During execution, the instructions may reside in system memory 203 or a cache memory (not depicted) of processor 102. At other times, the software may reside in ROM 206 or on another suitable computer readable medium such as a floppy diskette, hard disk, CD ROM, or magnetic tape.

As depicted in FIG. 3, boot code 300 includes high level boot code 302, a software interface 304, and a set of device specific code segments 306a, 306b, 306c, etc (generically or collectively referred herein as device specific segment(s) or device segment(s) 306). Generally, high level boot code 302 contains code that is independent of the specific type of device from which a system is being booted. In this sense, high level boot code 302 comprises code that is universal with respect to the various boot devices that might be used in system 200. Moreover, because most boot device types are similar in the functions that they support, the various device specific segments 306 may share much in common.

High level boot code 302 is written under the assumption that all available boot devices support a common set of functions. In this manner, a boot from a device that supports a limited set of functions (such as a TFTP boot device) will appear equivalent to a boot from a device that supports a full set of file functions from the perspective of high level boot code 302. The actual differences that exist between the various boot devices are handled by software interface 304 and device specific segments 306. Thus, high level boot code 302 may include a code sequence such as:

SEEK FILENAME DEVICENAME
READ #BLOCKS

This code segment would be received by software interface 304, which would invoke the appropriate device segment 306 to translate code received from high level boot code 302 to device specific code based on the device type of DEVICENAME. If, for example, DEVICENAME is a TFTP supported server, software interface would retrieve code from TFTP device segment 306n to translate the high level code sequence into a TFTP compatible command sequence. Similarly, if DEVICENAME is an NFS file device, the software interface 304 would retrieve code from the NFS device segment 306a to translate the high level code segment into an NFS compatible code segment.

Each device segment 306 may include code that is unique to the corresponding boot device type. For some common devices types, the variations in the device segments 306 may be relatively minor. Flash cards, hard drives, floppy diskettes and NFS devices all appear to high level boot code 302 as file devices that support OPEN, CLOSE, READ, WRITE, and SEEK functions. The commonality in functions supported by these boot device types minimizes variations among the corresponding code segments 306 such that code segment 306a for an NFS boot device and code segment 306b for a hard disk device may contain substantial similarity. Moreover, if the functions called out in high level boot code 302 are each supported by a particular device type, there may be an essentially one-to-one correspondence between functions in high level boot code 302 and functions in a corresponding device segment 306 such that the software interface code 304 for certain device types comprises a line-for-line translation of high level boot code 302.

Boot device types that support a significantly different set of functions than the functions called out in high level boot code 302, however, require software interface 304 to translate a high level code sequence into a device code sequence comprised of functions supported by the corresponding device type. A boot device residing on a TFTP network, for example, supports READ and WRITE functions, but only for reading and writing consecutive blocks of data always starting from the beginning of the file. If high level boot code 302 is written using functions most commonly supported by file-type boot devices (i.e., OPEN, CLOSE, READ, WRITE, and SEEK functions), high level boot code 302 will require translation into the code sequence supported by the TFTP server.

One embodiment of boot code 300 supports TFTP boot devices as well as file-type boot devices. For this embodiment of boot code 300, high level boot code 302 may be written using a file-type device function set including OPEN, CLOSE, READ, WRITE, and SEEK functions. Software interface 304 is responsible for converting or translating the file-type commands into TFTP compatible commands when the boot device is a TFTP boot device. Supporting TFTP boot devices as well as conventional file-type boot devices with boot code 300 beneficially improves the flexibility of network 100 without adding unwanted complexity to high level boot code 302.

TFTP does not support the OPEN command or the SEEK command. In addition, TFTP can execute a READ command, but the TFTP READ command reads an entire file starting from the beginning of the file. To simulate a file device, software interface 304 must be configured to read a specified number of bytes from a specified offset in a file. The translation of the OPEN command may be accomplished by issuing a TFTP read request to verify that a file is present. Thus, if software interface 304 received an OPEN command from high level boot code 302 and the specified device has a TFTP device type, software interface will retrieve a TFTP read request from device segment 306n and issue the read request to the TFTP device. If the device acknowledges the READ request, the file is present. Otherwise, software interface 304 will inform high level boot code 302 that the OPEN command failed.

Figure 4:
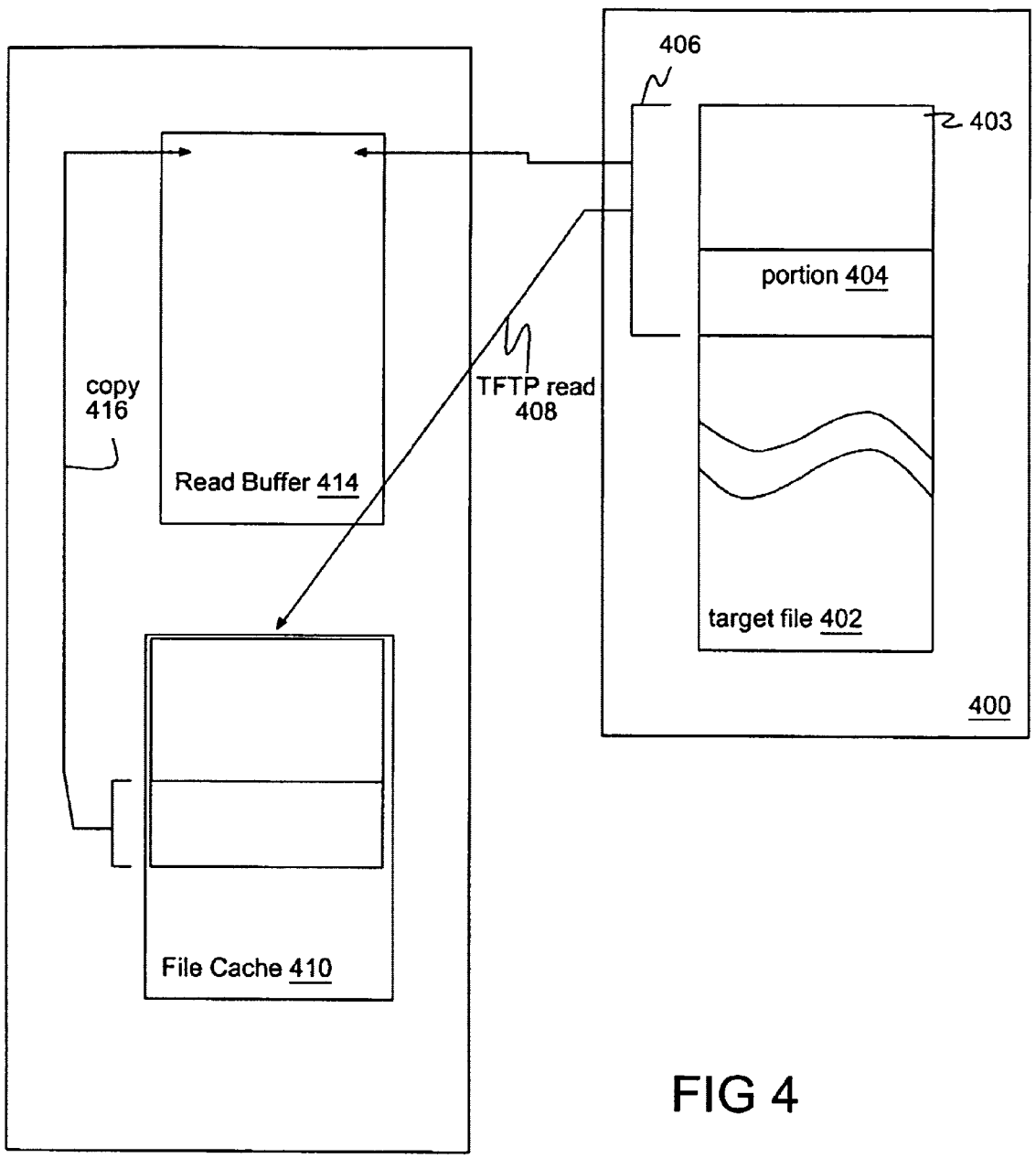
FIG. 4 illustrates a method of simulating file device commands on a TFTP server according to one embodiment of the invention.

For a READ command from high level boot code 302, software interface 304 may first determine if the requested data is present (as a result of a previous READ command) within a "file cache" that is maintained on network computer 104. FIG. 4 illustrates one embodiment of the manner in which a high level READ command is handled for TFTP boot device. The TFTP boot device 400 includes a target file 402 specified by the high level READ command. The high level READ command may request a first portion 404 of file 402 that is offset from the beginning 403 of file 402. Since the TFTP device is only capable of initiating a read from the beginning of the specified file, software interface 304 must retrieve (from device segment 306n) a READ command that reads a second portion (indicated by reference numeral 406) of target file 402 where second portion 406 extends from the beginning 403 of file 402 through the end of the first portion 404. In other words, the TFTP command must read (starting from the beginning of file 402) enough of file 402 to include first portion 404.

As the TFTP read command proceeds, the requested data is copied into a buffer 414 specified by the high level READ command. Additionally, as the data is read from file 402 (including the portion of file 402 before first portion 404), it may be copied into a file cache 410 on network computer 104 for subsequent retrieval. Typically, file cache 410 will reside in system memory 203. If the size of the second portion 406 retrieved with the TFTP read request, which is symbolized in FIG. 4 by reference numeral 408, exceeds the size of file cache 410, the earliest retrieved data may be discarded as needed. If a file cache 410 is used, software interface 304 may be responsible for maintaining information from which it can determine whether requested data is present (and valid) within the file cache. If the data corresponding to a particular high level READ command is present in file cache 410, the software interface 304 may simply copy the data from file cache 410 to read buffer 414. An example of a transfer of data from file cache 410 to buffer 414 is represented in FIG. 4 by reference numeral 416.

If a SEEK command is received from high level boot code 302 (and the boot device is a TFTP device), software interface 304 may first determine whether the SEEK position is forward of the current file position. Preferably, a file pointer is maintained by software to indicate the current position with the specified file. If the SEEK location is beyond the current file position, as indicated by the file pointer, and beyond any the location corresponding to any data that has been cached in file cache 410, a TFTP read request of sufficient blocks may be initiated to advance the file pointer from the pointer's current location to the location specified by the SEEK command. The data read during this TFTP read may be either stored in file cache 410 or discarded. If the SEEK location is prior to (in front of) the current pointer location, (and the SEEK location is not presently in file cache 410), the TFTP transfer must be restarted by aborting the current TFTP request, resending a new TFTP read request and reading sufficient blocks to include the specified location (i.e., move the file location pointer to the specified location). If the SEEK location is currently present in file cache 410, the file pointer may be simply be updated by software interface 304.

In the manner described, high level boot code 302 can be written without consideration of the specific implementation of the boot device. By providing a software interface 304 and device specific segments 306 for translating a universal set of high level commands in high level boot code 302, boot code 300 is capable of booting from a variety of boot devices. If revisions in boot code 300 are desired, it is typically necessary to update only the high level boot code 302.

Figure 5:
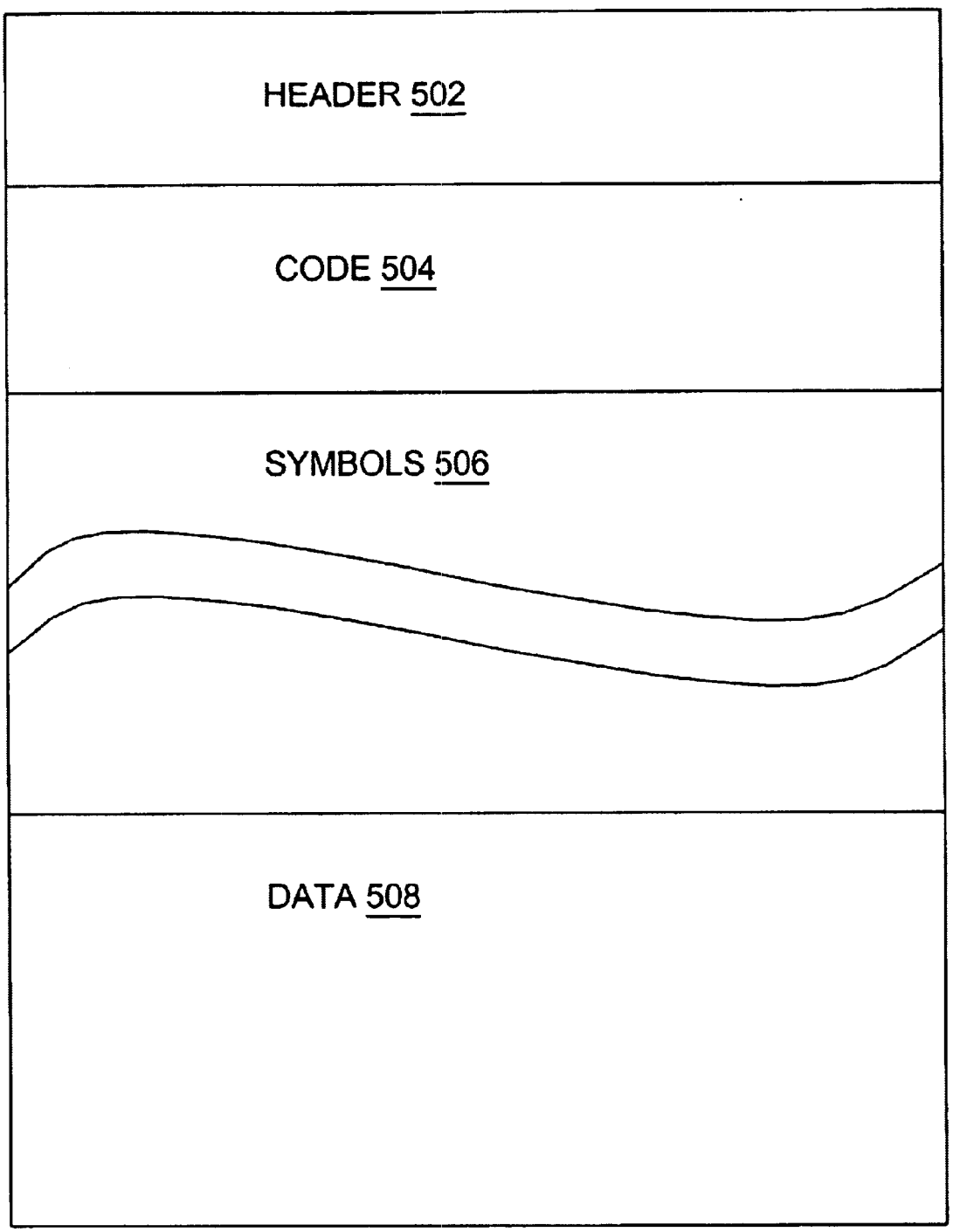
FIG. 5 a diagram of an ELF formatted file.

In addition to the benefits achieved with the present invention as described above, boot code 300 may be implemented to minimize the memory required to accomplish a successful boot from a TFTP boot device. Referring to FIG. 5, consider, as an example, an Executable and Linking Format (ELF) file 500 that includes an ELF header 502. The ELF header 502 specifies the locations and sizes of a code segment 504 and a data segment 508. If ELF file 500 resides on a TFTP boot device, the header 502 can be read with a TFTP read request as described above to determine the size and location of code segment 504 and data segment 508. A high level SEEK command can then be issued to forward the file pointer to the location of code segment 504 or data segment 508. In this manner, it may be unnecessary to store any non-useful information such as the symbol table 506 indicated in FIG. 5. By potentially reducing the amount of memory required to perform TFTP boot, this embodiment of the invention beneficially reduces the minimum required resources with which network computer may be designed.

It will be apparent to those skilled in the art having the benefit of this disclosure that the present invention contemplates a method and system for implementing a universal boot code that is capable of supporting a variety of boot device types including TFTP devices. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of booting a network computer with universal boot code, comprising:
   determining a device type of a boot device;
   converting a command in the universal boot code to a command executable by the boot device based upon the determined device type; and
   executing the converted command on the boot device to transfer data between the network computer and the boot device.

2. The method of claim 1, wherein the universal boot code is compatible with a hard disk boot device, an NFS server boot device, and a TFTP server boot device.

3. The method of claim 1, wherein the boot device is a TFTP server.

4. The method of claim 3, wherein the boot command is a READ command and the converted command includes a TFTP read request.

5. The method of claim 4, further comprising, caching data transferred by the TFTP read request in a file cache on the network computer.

6. The method of claim 5, further comprising, during a subsequent boot code READ command, determining if the requested data is cached in the file cache, and if so, retrieving the data from the file cache.

7. The method of claim 3, wherein the boot command is a SEEK command and the converted command includes a TFTP read request.

8. The method of claim 7, further comprising, determining the relative location of a file location indicated by the SEEK command and a current location of a file pointer.

9. The method of claim 8, further comprising, aborting a current TFTP transfer if the file location indicated by the SEEK precedes the current location of the file pointer and restarting a TFTP read request to advance the file pointer to the file location indicated by the SEEK command.

10. A network computer including at least one processor, a system memory, a non-volatile storage element, an input device, and a display device, the non-volatile storage element including boot code, comprising:
    a high level boot code segment configured with universal boot code commands for booting the network computer from a specified boot device;
    at least one device specific segment corresponding to a device type of the specified boot device, wherein the device specific segment includes commands executable by boot devices of the device type of the specified boot device; and
    a software interface segment suitable for converting commands in the high level boot code segment to commands in the device specific segment.

11. The network computer of claim 10, wherein the boot code includes a set of device specific segments corresponding to set of boot device types including a hard disk boot device, an NFS server boot device, and a TFTP server boot device.

12. The network computer of claim 10, wherein the specified boot device is a TFTP boot device type.

13. The network computer of claim 12, wherein the high level boot code segment includes a READ command and the converted command corresponding to the READ command includes a TFTP read request.

14. The network computer of claim 13, wherein converted command includes a commands for caching data transferred by the TFTP read request in a file cache on the network computer and, during a subsequent boot code READ command, determining if the requested data is cached in the file cache and, if so, retrieving the data from the file cache.

15. The network computer of claim 12, wherein the high level boot code segment includes a SEEK command and the converted command corresponding to the SEEK command includes a TFTP read request.

16. A computer program product comprising a computer readable medium configured with computer executable instructions for booting a network computer with universal boot code, the instructions comprising:
    computer code means for determining a device type of a boot device;
    computer code means for converting a command in the universal boot code to a command executable by the boot device based upon the determined device type; and
    computer code means for executing the converted command on the boot device to transfer data between the network computer and the boot device.

17. The computer program product of claim 16, wherein the universal boot code is compatible with a hard disk boot device, an NFS server boot device, and a TFTP server boot device.

18. The computer program product of claim 17, wherein the boot device is a TFTP server.

19. The computer program product of claim 18, wherein the universal boot code command is a READ command and the corresponding converted command includes a TFTP read request.

20. The computer program product of claim 19, further comprising, computer code means for caching data transferred by the TFTP read request in a file cache on the network computer and computer code means for determining, during a subsequent boot code READ command, if the requested data is cached in the file cache and, if so, retrieving the data from the file cache.

21. The computer program product of claim 18, wherein the universal boot code command is a SEEK command and the corresponding converted command includes a TFTP read request.

* * * * *